(12) United States Patent
Kao et al.

(10) Patent No.: US 8,310,646 B2
(45) Date of Patent: Nov. 13, 2012

(54) LCOS CELL STRUCUTRE

(75) Inventors: Lu-Yang Kao, Hsinchu (TW); Yi-Tyng Wu, Chia-I (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 476 days.

(21) Appl. No.: 12/618,796

(22) Filed: Nov. 16, 2009

(65) Prior Publication Data

US 2011/0116030 A1    May 19, 2011

(51) Int. Cl.
*G02F 1/1339* (2006.01)
*G02F 1/1333* (2006.01)

(52) U.S. Cl. .................. 349/155; 349/138; 349/158

(58) Field of Classification Search .............. 349/155, 349/156, 138, 158
See application file for complete search history.

(56) References Cited

U.S. PATENT DOCUMENTS

| | | | |
|---|---|---|---|
| 6,317,187 B1 * | 11/2001 | Nakajima et al. | 349/155 |
| 7,008,808 B2 * | 3/2006 | Jen | 438/30 |
| 2007/0153211 A1 | 7/2007 | Whitehead Jr. | |

\* cited by examiner

*Primary Examiner* — Thoi Duong
(74) *Attorney, Agent, or Firm* — Winston Hsu; Scott Margo

(57) ABSTRACT

A liquid crystal on silicon (LCoS) cell structure includes a substrate, a plurality of top metal regions arranged in an array, a dielectric material filling between the top metal regions and a composite post spacer disposed on the dielectric material and encircling to form a cell space. The composite post spacer includes a first dielectric layer disposed on the dielectric material and a spacer material layer disposed on the first dielectric layer. The spacer material layer and the first dielectric layer are substantially different.

19 Claims, 4 Drawing Sheets

LCOS CELL STRUCUTRE

BACKGROUND OF THE INVENTION

1. Field of the Invention

The present invention generally relates to a liquid crystal on silicon (LCoS) cell structure. In particular, the present invention relates to a liquid crystal on silicon cell structure with a composite post spacer which surrounds to form a cell space.

2. Description of the Prior Art

In modern planar display technology, plasma display panels (PDPs) and liquid crystal displays (LCDs) are popular choices. They both constitute numerous display grids called pixel cells. The former one is applied in a large-sized market and still has not reached widespread acceptance since the technique for mass production has still not been perfected and because cost is still high. A thin-film transistor LCD (TFT LCD), which has prevailed in recent years, is representative of the latter one.

A liquid crystal on silicon (LCoS) display is a display which utilizes a silicon chip as a substrate and utilizes a standard CMOS process to form pixel cell matrices, integrated drivers, and other electronic devices on the silicon chip. An advantage of the LCOS display is its utilization of the CMOS process, since the CMOS process is well developed in the present semiconductor industry. As a result, high stability and reliability can be achieved when compared to the LCD. In addition, using this process, each pixel pitch can be shrunk to less than 10 µm, therefore high resolutions are obtained.

Moreover, a liquid crystal on silicon display also has the advantages of having small pixel sizes, high brightness, high resolution, simple fabricating processes, low cost, and a small volume. Therefore the liquid crystal on silicon display panels have been applied to video and media equipments, such as handy cameras, digital cameras, projection TVs, and multimedia overhead projectors.

The liquid-crystal-on-silicon projection systems work on similar principles to LCD projection systems. A significant difference between a liquid crystal on silicon display projection system and an LCD projection system is the way to modulate light within the projection system. The LCD projection system has a transmissive architecture, and light emitted from a light source has to pass liquid crystal so as to be modulated. The liquid crystal on silicon display projection system has a reflective architecture and uses a liquid crystal on silicon display panel, which is composed of a glass substrate, liquid crystal, and a CMOS chip with electricity circuits and a reflective layer coated thereon, to modulate optical signals produced by a light source and reflect the modulated signals to a projection screen.

The difference between an LCOS display and a conventional thin film transistor-liquid crystal display (TFT-LCD) is materials used for forming substrates. Both a cover substrate and a backplane are made of glass in a TFT-LCD. Nevertheless, the cover substrate in an LCOS display is made of glass, but the backplane in an LCOS display is a semiconductor silicon substrate. Therefore, an LCOS process combines LCD techniques and complementary metal-oxide semiconductor (CMOS) processes.

When compared to the PDP, the LCOS display not only has an absolute superiority in cost but also has intrinsic advantages of the LCD. In addition, being assisted with adequate projection techniques, the liquid crystal on silicon display can further be applied in markets for large-sized displays. Therefore, the liquid crystal on silicon display attracts many major manufacturers to devote themselves to development, and is the display with the highest potential.

Traditionally speaking, a sealant is used in a liquid crystal on silicon display panel. Please refer to FIG. 1, illustrating a conventional liquid crystal on silicon display panel. The liquid crystal on silicon display panel 1 includes a silicon substrate (a lower substrate) 10 and a glass substrate (an upper substrate) 20. There is a sealant 30 sandwiched between the lower substrate 10 and the upper substrate 20. The sealant 30 on one hand may glue the lower substrate 10 firmly to the upper substrate 20. The sealant 30 on the other hand may keep the lower substrate 10 and the upper substrate 20 apart a suitable distance so that a liquid crystal 40 may fill the chamber, called a cell space 41, which is surrounded by the lower substrate 10, the upper substrate 20 and the sealant 30. Also, pixel electrodes 50 are arranged in an array on the lower substrate 10 within the sealant 30.

However, due to the technical and market demands on the liquid crystal on silicon display panels, the distance between the lower substrate 10 and the upper substrate 20 is getting shorter and shorter, and the sealant 30 is accordingly getting harder and harder to use to define the thickness of the cell space 41, called a cell gap. In addition, because the sealant 30 is translucent, light within the cell space 41 may escape and the contrast of the liquid crystal on silicon display panel 1 as a result deteriorates.

Currently, spacer balls are used to replace the sealant 30 for defining the thickness of the cell space 41. However, in one aspect it is an easy task to fabricate spacer balls of uniform size, and in another aspect the process also gets more complicated to add the spacer balls into the liquid crystal on silicon display panel 1.

As a result, a novel liquid crystal on silicon cell structure is still needed. The novel liquid crystal on silicon cell structure should be able to maintain the thickness of the cell spacer in the absence of space balls. Moreover, the novel liquid crystal on silicon cell structure should also be able to maintain the thickness of the cell spacer to be as small as possible.

SUMMARY OF THE INVENTION

The present invention in one aspect proposes a novel liquid crystal on silicon cell structure. The novel liquid crystal on silicon cell structure of the present invention is able to maintain the cell spacer to have a thickness as small as possible in the absence of the space balls. In another aspect, the present invention proposes another novel liquid crystal on silicon cell structure. The novel liquid crystal on silicon cell structure of the present invention hardly leaks light so that the contrast of the liquid crystal on silicon panel can be further enhanced and pictures of better quality can be provided.

The present invention first proposes a liquid crystal on silicon cell structure. The liquid crystal on silicon cell structure of the present invention includes a substrate, multiple top metal patterns arranged in an array, a dielectric material filling the gap between the multiple top metal patterns and a composite post spacer disposed on the dielectric material and surrounding to form a cell space. The composite post spacer includes a first dielectric layer disposed on the dielectric material, as well as a spacer material layer disposed on the first dielectric layer. The first dielectric layer and the spacer material layer have a sufficiently large etching difference.

The present invention again proposes a liquid crystal on silicon cell structure. The liquid crystal on silicon cell structure of the present invention includes a substrate, multiple top metal patterns arranged in an array, a dielectric material filling the gap between the multiple top metal patterns and a composite post spacer disposed on the dielectric material and surrounding to form a cell space. The composite post spacer includes a first dielectric layer disposed on the dielectric material, and a spacer material layer disposed on the first dielectric layer. The spacer material layer is substantially non-translucent.

These and other objectives of the present invention will no doubt become obvious to those of ordinary skill in the art after reading the following detailed description of the preferred embodiment that is illustrated in the various figures and drawings.

DETAILED DESCRIPTION

The present invention first provides a novel liquid crystal on silicon cell structure. The novel liquid crystal on silicon cell structure of the present invention is able to maintain the cell spacer to have a thickness as small as possible in the absence of the aid of space balls.

Figure 1:
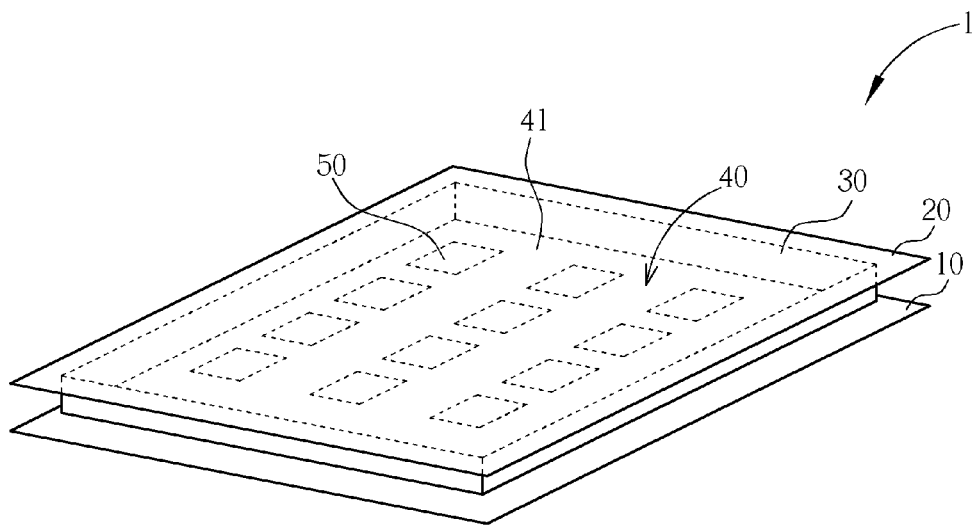
FIG. 1 illustrates a conventional liquid crystal on silicon display panel.
Figure 2:
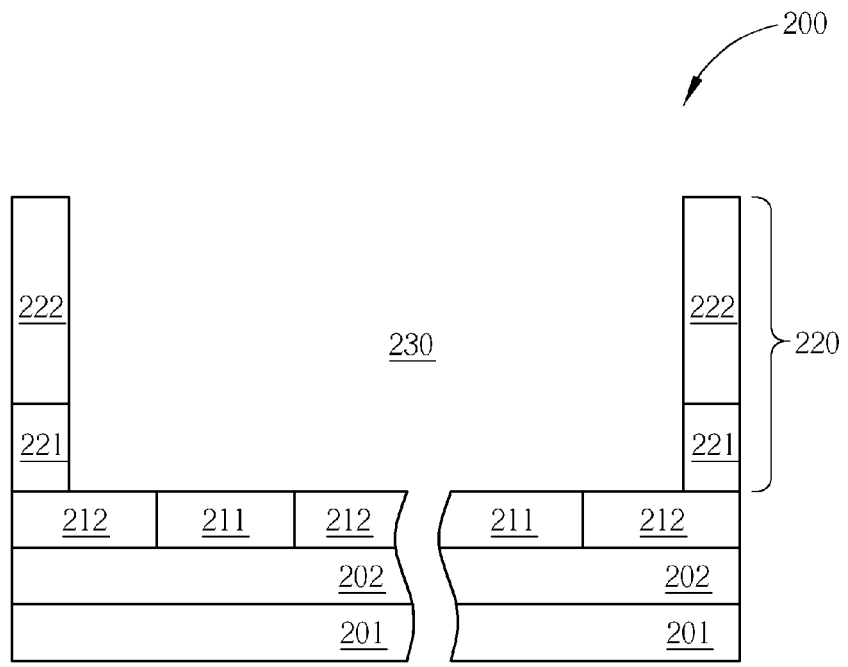
FIG. 2 illustrates an embodiment of the liquid crystal on silicon cell structure of the present invention.

FIG. 2 illustrates an embodiment of the liquid crystal on silicon cell structure of the present invention. Please refer to FIG. 2. The liquid crystal on silicon cell structure 200 includes a substrate 201, multiple top metal patterns 211, a dielectric material 212 and a composite post spacer 220. The substrate 201 may be a semiconductor material, such as Si or other suitable material layers. If the substrate 201 is a semiconductor material, the liquid crystal on silicon cell structure 200 of the present invention may be fabricated by the standard CMOS process to make the pixel cell matrix (not shown), integrated drivers (not shown) or other electronic elements, which is one of the features of the present invention. Usually, a top inter-material dielectric 202 (top IMD) is disposed on the top of the substrate 201.

Figure 3:
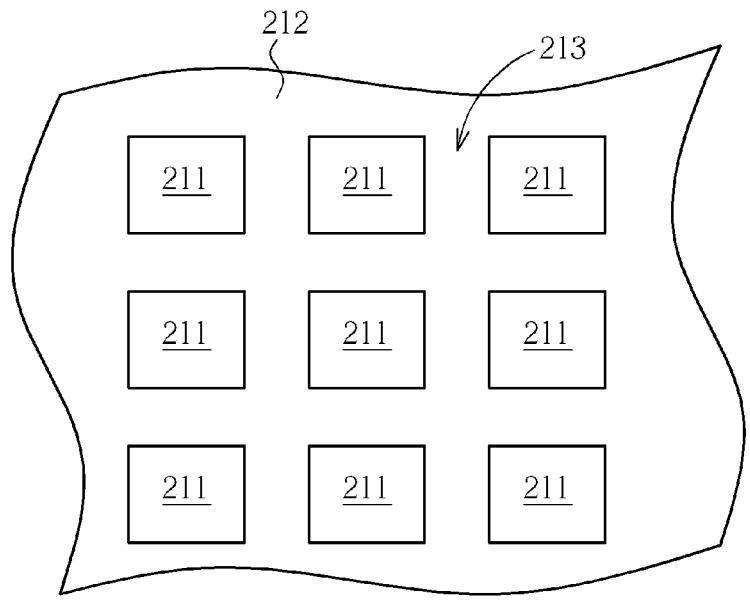
FIG. 3 illustrates the arrangement of the top metal patterns in the liquid crystal on silicon cell structure of the present invention.

The top metal pattern 211 and the dielectric material 212 are respectively disposed on the substrate 201, i.e. respectively disposed on the top inter-material dielectric 202, so that the horizontal level of the top metal pattern 211 and of the dielectric material 212 is substantially the same. FIG. 3 illustrates the arrangement of the top metal patterns in the liquid crystal on silicon cell structure of the present invention. Please refer to FIG. 3, a plurality of top metal patterns 211 which may serve as pixel electrodes are arranged in an array on the substrate 201, such as in a check board shape, in a stripe shape, in a triangle shape or in a Mosaic shape. The dielectric material 212 fills the gap 213 which is among the top metal patterns 211. The top metal patterns 211 may include a metal of high reflection coefficient, such as and there may be an optional dichroic layer (not shown) disposed on the top metal patterns 211. Besides, the dielectric material 212 may be a silicon compound, such as at least one of an oxide and a nitride. In addition, there may be an additional passivation layer, such as a multi-layer thin film (O—N—O—N), covering the surface of the top metal patterns 211 and of the dielectric material 212.

The composite post spacer 220 is disposed on the dielectric material 212. The composite post spacer 220 surrounds on the substrate 201 to form a cell space 230. The size of the cell space 230 may depend on the specification of the liquid crystal on silicon products. The composite post spacer 220 includes at least a first dielectric layer 221 disposed on the dielectric material 212, and a spacer material layer 222 disposed on the first dielectric layer 221.

The spacer material layer 222 and the first dielectric layer 221 preferably have an etching difference, i.e. an etching selectivity, which is sufficiently large. In other words, under a specific etching circumstance, the etching selectivity between the spacer material layer 222 and the first dielectric layer 221 should be substantially large enough so that one of which is substantially etched and the other is substantially not etched. As a result, they may serve as an etching-stop layer. For example, the first dielectric layer 221 may include a silicon compound, such as at least one of an oxide and a nitride. On the other hand, the spacer material layer 222 may include a metal material, such as Al, a conductive material, such as poly-Si, or an organic polymer material, such as polyimide. If the first dielectric layer 221 and the dielectric material 212 are both a silicon compound, the first dielectric layer 221 and the dielectric material 212 may have a sufficiently immaterial etching difference. For example they may be of the same material to simplify the structure and the fabricating process. When the first dielectric layer 221 is not too thick, the etching procedure may be precisely controlled so that an over-etching result may not occur.

Figure 4:
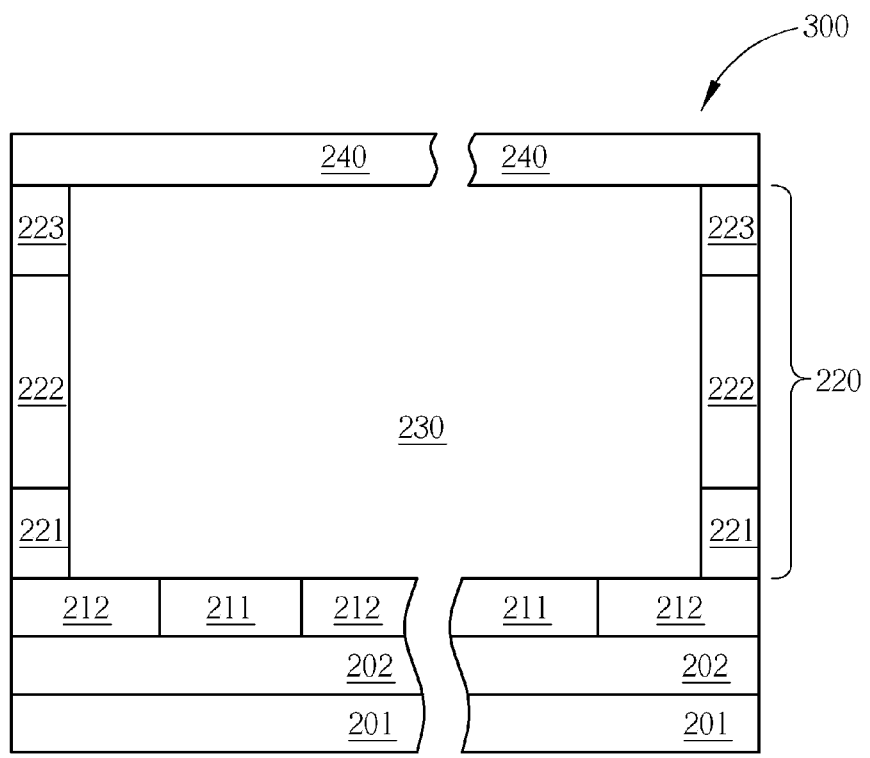
FIG. 4 illustrates an embodiment of the liquid crystal on silicon cell structure of the present invention.

Optionally, the height of the composite post spacer 220 may be 1 μm-2 μm. Further, the composite post spacer 220 may include a second dielectric layer 223. As shown in FIG. 4, preferably the second dielectric layer 223 is disposed on the spacer material layer 222 so that the composite post spacer 220 becomes a sandwich structure. Preferably, the spacer material layer 222 and the second dielectric layer 223 have an etching difference which is sufficiently large. When the composite post spacer 220 further includes a second dielectric layer 223, the height of the first dielectric layer 221 may be 500-5000 Å so that the first dielectric layer 221 is not too thick.

In the liquid crystal on silicon cell structure 200 of the present invention, the conventional structure of using spacer balls may be omitted because the composite post spacer 220 is designed to maintain the distance between the upper substrate 240 and the lower substrate 201, i.e. the height of the composite post spacer 220 is the distance of the cell gap 230 to contain a liquid crystal. On the other hand, the height of the composite post spacer 220 may be optionally adjusted to keep the cell gap as short as possible to meet the demand of product design.

In another aspect, the present invention also provides another liquid crystal on silicon cell structure. Another liquid crystal on silicon cell structure of the present invention hardly leaks light due to a structural modification so that the contrast of the liquid crystal on silicon panel can be further enhanced and pictures of better quality can be provided.

Figure 5:
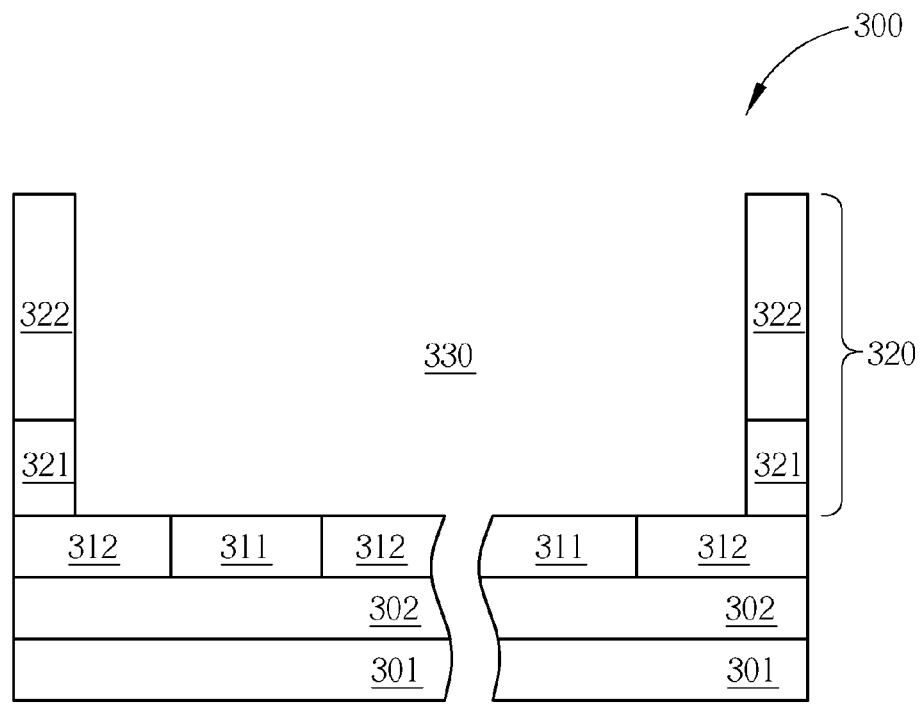
FIG. 5 illustrates another embodiment of the liquid crystal on silicon cell structure of the present invention.

FIG. 5 illustrates another embodiment of the liquid crystal on silicon cell structure of the present invention. Please refer to FIG. 5. The liquid crystal on silicon cell structure 300 includes a substrate 301, multiple top metal patterns 311, a dielectric material 312 and a composite post spacer 320. The substrate 301 may be a semiconductor material, such as Si or other suitable material layers. If the substrate 301 is a semiconductor material, the liquid crystal on silicon cell structure 300 of the present invention may be fabricated by the standard CMOS process to make the pixel cell matrix (not shown), integrated drivers (not shown) or other electronic elements, which is one of the features of the present invention. Usually, a top inter-material dielectric 302 (top IMD) is disposed on the top of the substrate 301.

Figure 6:
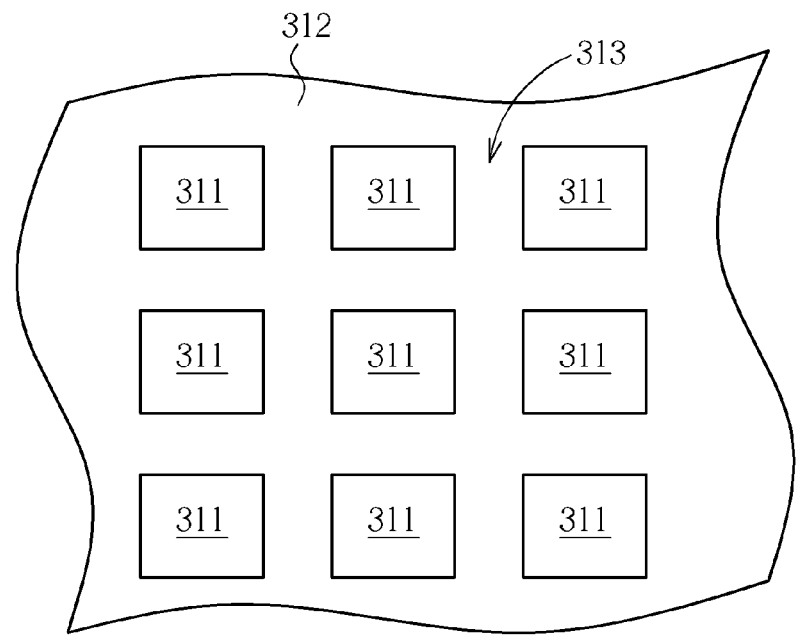
FIG. 6 illustrates the arrangement of the top metal patterns in the liquid crystal on silicon cell structure of the present invention.

The top metal patterns 311 and the dielectric material 312 are respectively disposed on the substrate 301, i.e. respectively disposed on the top inter-material dielectric 302, so that the horizontal level of the top metal patterns 311 and of the dielectric material 312 is substantially the same. FIG. 6 illustrates the arrangement of the top metal patterns in the liquid crystal on silicon cell structure of the present invention. Please refer to FIG. 6, a plurality of top metal patterns 311 which may serve as pixel electrodes are arranged in an array on the substrate 301, such as in a check board shape, in a stripe shape, in a triangle shape or in a Mosaic shape. The dielectric material 312 fills the gap 313 which is among the top metal patterns 311. The top metal patterns 311 may include a metal of high reflection coefficient, such as and there may be an optional dichroic layer (not shown) disposed on the top metal patterns 311. Besides, the dielectric material 312 may include a silicon compound, such as at least one of an oxide and a nitride. In addition, there may be an additional passivation layer, such as a multi-layer thin film (O—N—O—N), covering the surface of the top metal patterns 311 and of the dielectric material 312.

The composite post spacer 320 is disposed on the dielectric material 312. The composite post spacer 320 surrounds on the substrate 301 to form a cell space 330. The size of the cell space 330 may depend on the specification of the liquid crystal on silicon products. The composite post spacer 320 includes at least a first dielectric layer 321 disposed on the dielectric material 312, and a spacer material layer 322 disposed on the first dielectric layer 321.

Figure 7:
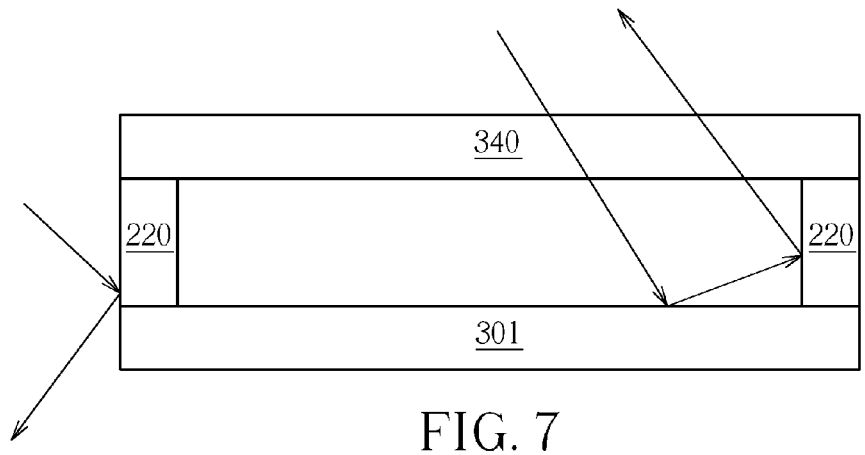
FIG. 7 illustrates another embodiment of the liquid crystal on silicon cell structure of the present invention.

The differences between the embodiment of FIG. 2 and the embodiment of FIG. 5 reside in that the spacer material layer 322 on the first dielectric layer 321 is substantially non-translucent. As a result, the light within the cell space 330 does not leak through the composite post spacer 320, as shown in FIG. 7. Still, the light outside the cell space 330 does not enter the cell space 330 through the composite post spacer 320, either. In another aspect, the height of the spacer material layer 322 is preferably higher than that of the first dielectric layer 321. Optionally, the height of the composite post spacer 320 may be 1 µm-2 µm. The height of the first dielectric layer 321 may be 500-5000 Å so that the first dielectric layer 321 is not too thick to keep the light within or without.

On the other hand, the material of the spacer material layer 322 and the material of the first dielectric layer 321 may be different. For example, the first dielectric layer 321 may be a silicon compound, such as at least one of an oxide and a nitride. However, the spacer material layer 322 may include a metal material, such as Al, a conductive material, such as poly-Si, or an organic polymer material, such as polyimide. Accordingly, the spacer material layer 322 and the first dielectric layer 321 preferably have an etching difference, i.e. an etching selectivity, which is sufficiently large. In other words, under a specific etching circumstance, the etching selectivity of the spacer material layer 322 and the first dielectric layer 321 should be substantially large enough so that one of which is substantially etched and the other is substantially not etched. As a result, they may serve as an etching-stop layer. If the first dielectric layer 321 and the dielectric material 312 are both silicon compound, the first dielectric layer 321 and the dielectric material 312 may have a sufficiently immaterial etching difference.

Figure 8:
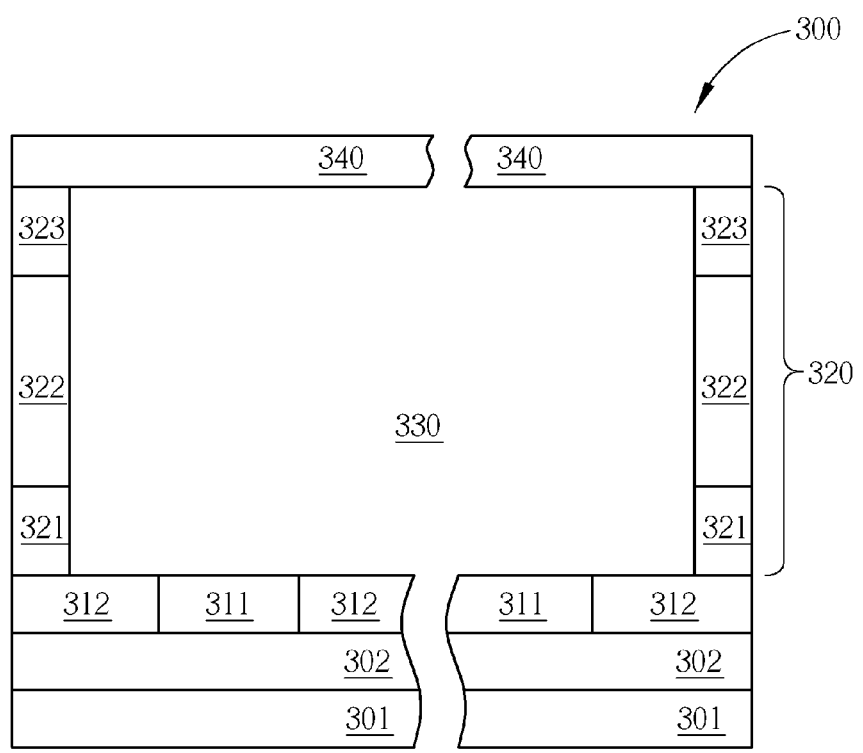
FIG. 8 illustrates another embodiment of the liquid crystal on silicon cell structure of the present invention.

Further, the composite post spacer 320 may include a second dielectric layer 323. As shown in FIG. 8, preferably the second dielectric layer 323 is disposed on the spacer material layer 322 so that the composite post spacer 320 becomes a sandwich structure. The second dielectric layer 323 may include a silicon compound, such as at least one of an oxide and a nitride. Preferably, the spacer material layer 322 and the second dielectric layer 323 have an etching difference which is sufficiently large.

In the liquid crystal on silicon cell structure 300 of the present invention, the light within the cell space 330 is less likely to escape because the composite post spacer 320 is almost non-translucent. Also, the height of the composite post spacer 320 is the distance of the cell gap 330. In such a way, the contrast of the liquid crystal on silicon panel can be further enhanced and pictures of better quality can be provided.

Those skilled in the art will readily observe that numerous modifications and alterations of the device and method may be made while retaining the teachings of the invention.

What is claimed is:

1. A liquid crystal on silicon (LCoS) cell structure, comprising:
   a substrate;
   multiple top metal patterns arranged in an array;
   a dielectric material filling the gap between said multiple top metal patterns; and
   a composite post spacer disposed on said dielectric material and surrounding to form a cell space, said composite post spacer comprising:
   a first dielectric layer disposed on said dielectric material;
   a spacer material layer disposed on said first dielectric layer, wherein said first dielectric layer and said spacer material layer have an etching selectivity; and
   a second dielectric layer disposed on said spacer material layer.

2. The liquid crystal on silicon (LCoS) cell structure of claim 1, wherein said substrate comprises a top inter-metal dielectric, (top IMD).

3. The liquid crystal on silicon (LCoS) cell structure of claim 1, wherein said first dielectric layer and said dielectric material do not have an etching selectivity.

4. The liquid crystal on silicon (LCoS) cell structure of claim 1, wherein said first dielectric layer and said dielectric material respectively comprise at least one of an oxide and a nitride.

5. The liquid crystal on silicon (LCoS) cell structure of claim 1, wherein said composite post spacer has a height of 1 µm-2 µm.

6. The liquid crystal on silicon (LCoS) cell structure of claim 1, wherein said second dielectric layer and said spacer material layer have an etching selectivity.

7. The liquid crystal on silicon (LCoS) cell structure of claim 1, wherein said first dielectric layer has a height of 500-5000 Å.

8. The liquid crystal on silicon (LCoS) cell structure of claim 1, wherein said spacer material layer comprises at least one of a metal or an organic polymer material.

9. The liquid crystal on silicon (LCoS) cell structure of claim 1, wherein said spacer material layer is substantially non-translucent.

10. A liquid crystal on silicon (LCoS) cell structure, comprising:
a substrate;
multiple top metal patterns arranged in an array;
a dielectric material filling the gap between said multiple top metal patterns; and
a composite post spacer disposed on said dielectric material and surrounding to form a cell space, said composite post spacer comprising:
a first dielectric layer disposed on said dielectric material;
a spacer material layer disposed on said first dielectric layer, wherein said spacer material layer is substantially non-translucent; and
a second dielectric layer disposed on said spacer material layer.

11. The liquid crystal on silicon (LCoS) cell structure of claim 10, wherein said substrate comprises a top inter-metal dielectric, (top IMD).

12. The liquid crystal on silicon (LCoS) cell structure of claim 10, wherein said first dielectric layer and said dielectric material do not have an etching selectivity.

13. The liquid crystal on silicon (LCoS) cell structure of claim 10, wherein said first dielectric layer and said dielectric material respectively comprise at least one of an oxide and a nitride.

14. The liquid crystal on silicon (LCoS) cell structure of claim 10, wherein said composite post spacer has a height of 1 μm-2 μm.

15. The liquid crystal on silicon (LCoS) cell structure of claim 10, wherein said second dielectric layer and said spacer material layer have an etching selectivity.

16. The liquid crystal on silicon (LCoS) cell structure of claim 10, wherein said first dielectric layer has a height of 500-5000 Å.

17. The liquid crystal on silicon (LCoS) cell structure of claim 10, wherein said spacer material layer comprises at least one of a metal and an organic polymer material.

18. The liquid crystal on silicon (LCoS) cell structure of claim 10, wherein said first dielectric layer and said spacer material layer have an etching selectivity.

19. A liquid crystal on silicon (LCoS) cell structure, comprising:
a substrate;
multiple top metal patterns arranged in an array;
a dielectric material filling the gap between said multiple top metal patterns; and
a composite post spacer disposed on said dielectric material and surrounding to form a cell space, said composite post spacer comprising:
a first dielectric layer disposed on said dielectric material and having a first thickness; and
a spacer material layer disposed on said first dielectric layer and having a second thickness, wherein said first dielectric layer and said spacer material layer have an etching selectivity and said first thickness is not greater than said second thickness.

* * * * *

UNITED STATES PATENT AND TRADEMARK OFFICE
CERTIFICATE OF CORRECTION

| | | |
|---|---|---|
| PATENT NO. | : 8,310,646 B2 | Page 1 of 1 |
| APPLICATION NO. | : 12/618796 | |
| DATED | : November 13, 2012 | |
| INVENTOR(S) | : Lu-Yang Kao et al. | |

It is certified that error appears in the above-identified patent and that said Letters Patent is hereby corrected as shown below:

On the title page, item (54), correct the invention title from "LCOS CELL STRUCUTRE" to --LCOS CELL STRUCTURE--.

Signed and Sealed this
Twenty-second Day of January, 2013

David J. Kappos
*Director of the United States Patent and Trademark Office*

UNITED STATES PATENT AND TRADEMARK OFFICE
CERTIFICATE OF CORRECTION

PATENT NO. : 8,310,646 B2  Page 1 of 1
APPLICATION NO. : 12/618796
DATED : November 13, 2012
INVENTOR(S) : Lu-Yang Kao et al.

It is certified that error appears in the above-identified patent and that said Letters Patent is hereby corrected as shown below:

On the title page, item (54) and at column 1, line 1, correct the invention title from "LCOS CELL STRUCUTRE" to --LCOS CELL STRUCTURE--.

This certificate supersedes the Certificate of Correction issued January 22, 2013.

Signed and Sealed this
Nineteenth Day of February, 2013

Teresa Stanek Rea
*Acting Director of the United States Patent and Trademark Office*